United States Patent Office 3,318,877
Patented May 9, 1967

3,318,877
16,17,18-TRIEPI-DESERPIDATES
Paul Reuben Ulshafer and William Irving Taylor, Summit, N.J., assignors to Ciba Corporation, New York, N.Y., a corporation of Delaware
No Drawing. Filed Feb. 2, 1965, Ser. No. 429,902
13 Claims. (Cl. 260—240)

This application is a continuation-in-part of our application Ser. No. 420,773 filed Dec. 23, 1964, now abandoned.

The present invention concerns and has for its object the provision of 16,17,18-triepi-deserpidic acid esters and methods for their preparation.

More particularly the present invention relates to compounds having the Formula I

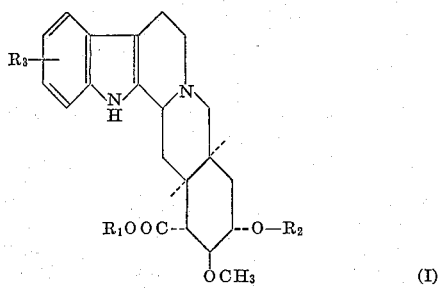

in which $R_1$ stands for an aliphatic radical, $R_2$ for the acyl radical of an aliphatic, araliphatic or aromatic carboxylic acid and $R_3$ for hydrogen or lower alkoxy.

The aliphatic radical $R_1$ preferably represents lower alkyl, such as methyl, ethyl, n-propyl, isopropyl, n-butyl, isobutyl, sec. butyl, tert. butyl, n-pentyl, neopentyl, n-hexyl or n-heptyl, but also represents lower alkyl substituted by lower alkoxy or tert. amino, whereby the carboxy oxygen is separated from these groups by at least two carbon atoms. Examples of said lower alkyl-substituents are the following: methoxy, ethoxy, n-propoxy, isopropoxy, n-butoxy or tert. butoxy; di-lower alkyl-amino, lower alkyleneimino, aza-, oxa- or thia-lower alkyleneimino in which latter the nitrogen, oxygen or sulfur atom is separated from the imino nitrogen by at least two carbon atoms, such as dimethylamino, N-methyl-N-ethylamino, diethylamino, di-n-propylamino, di-isopropyl-amino or N-ethyl-N-butylamino; pyrrolidino, piperidino, 1,5-, 2,5- or 1,6-hexyleneimino, or 1,7-heptyleneimino; piperazino, 4-lower alkyl-piperazino, e.g. 4-methyl- or 4-ethyl-piperazino, 4-morpholino, 3,5-dimethyl-4-morpholino or 4-thiamorpholino.

The acyl radical $R_2$ more particularly is derived from a lower alkanoic, alkenoic, alkynoic, cycloalkane- or cycloalkene-carboxylic, cycloalkyl- or cycloalkenyl-lower alkanoic or alkenoic, monocyclic carbocyclic aryl-lower alkanoic or alkenoic or monocyclic carbocyclic aryl carboxylic acid. It may be unsubstituted or substituted by one or more than one of the same or of different substituents, such as hydroxy, lower alkoxy, lower alkanoyloxy, lower alkoxy-carbonyloxy, lower alkanoyl, halogen, amino, e.g. di-lower alkylamino and carboxy and for the aromatic acids or the aromatic portion of the araliphatic acids also lower alkyl and nitro. Examples for these acids are the following: formic, acetic, propionic, butyric, valeric, pivalic, acrylic, methacrylic, crotonic, angelic, tiglic, tetrolic, cyclopentane- or cyclohexane-carboxylic, β-cyclopentylpropionic, cyclohexenyl-acetic, β-cyclohexyl-acrylic, phenylacetic, cinnamic, or benzoic acid; glycollic, ethoxycarbonic, methoxy-acetic, ethoxy-acetic, dimethoxymethyl-acetic, trimethoxymethyl-acetic, n-butoxy-acetic, β-ethoxy-propionic, α-dimethoxymethyl-propionic, phenoxy-acetic, acetoacetic, dimethylamino-acetic, malonic, succinic, glutaric, malic, fumaric, maleic, tartaric, citric, shikimic, tetrahydrophthalic, 4-methoxyphenyl-acetic, 3,4,5-trimethoxyphenyl-acetic, 4-methoxy-cinnamic, 3,5-dimethoxy-4-ethoxy-carbonyloxy-cinnamic, p-toluic, 3,4,5-trimethyl-benzoic, 4-hydroxy-benzoic, 2,5-dihydroxy-benzoic, 6-methoxy-benzoic, 3,4,5-trimethoxy-benzoic, 4-ethoxy-benzoic, 3,4,5-triethoxy-benzoic 3,5-dimethyl-4-methoxy-benzoic, 3,5-dimethoxy-4-ethoxy-carbonyloxy-benzoic, 3,5-diethoxy-4-ethoxycarbonyloxy-benzoic, 4-acetoxy-benzoic, 4-acetyl-benzoic, 4-nitro-benzoic, 3-amino-benzoic, 3-dimethylamino-benzoic, 3-chloro-benzoic, 3,4-dichloro-benzoic, 4-fluoro-benzoic, 4-trifluoromethyl-benzoic, or 2,6-dimethyl-4-chloro-benzoic acid.

The compounds of the present invention possess valuable pharmacological properties. For example, they cause a marked decrease of the blood pressure and diminish the responses to hypertensives, such as epinephrine, l-norepinephrine, amphetamine, angiotensin amide or isoproterenol. They are, therefore, useful as hypotensive agents to counteract hypertensive conditions, such as renal hypertension or toxemia, and as antagonists of hypertensive agents. They may also serve as starting materials or intermediates in the manufacture of other valuable compounds, especially medicines.

Particularly useful are compounds of the Formula II

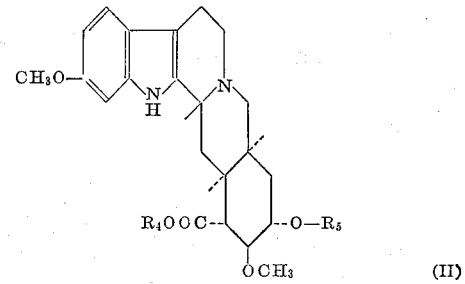

in which $R_4$ stands for lower alkyl and $R_5$ for benzoyl or cinnamoyl substituted in the ring by one or more than one, preferably three, lower alkoxy and/or lower alkoxy-carbonyloxy groups.

The compounds of the invention defined by Formula I are prepared by methods in themselves known. For example they can be prepared by (a) Esterifying an $R_1$ 16,17,18-triepi-deserpidate with the acid $R_2OH$ or a reactive functional derivative thereof or (b) Esterifying an 18-O-$R_2$-16,17,18-triepi-deserpidic acid or a reactive functional derivative thereof with the alcohol $R_1$—OH, a reactive ester or the corresponding diazo compound thereof or (c) Adding methanol to an $R_1$ 17-desmethoxy-18-O-$R_2$-18-epi-$\Delta^{16}$-deserpidate or (d) Hydrogenating an $R_1$ 18-O-$R_2$-16,17,18-triepi-$\Delta^3$-deserpidate or (e) Isomerizing an $R_1$ 18-O-$R_2$-3,16,17,18-tetraepi-deserpidate by the action of an acidic agent and, if desired, converting a resulting free base into a salt thereof or converting a resulting salt into the corresponding free base or into another salt and/or separating a mixture of isomers into the single isomers.

A reactive functional derivative of an acid, e.g. of $R_2$—OH, primarily is a halide, e.g. the chloride or bromide, or an anhydride, e.g. a pure or mixed anhydride or ketene. It may also be a salt, especially of the 18-O-$R_2$-16,17,18-triepideserpidic acid, e.g. an alkali metal or silver salt, or an ester thereof with alcohols other than $R_1$—OH or an ester of the $R_1$ 16,17,18-triepi-deserpidate with acids other than $R_2$—OH, so that the procedures (a) and (b) represent transesterifications.

A reactive functional derivative of an alcohol $R_1$—OH is, for example, a hydrohalic acid ester, e.g. the $R_1$ chloride, bromide or iodide, or a sulfinic or sulfonic acid ester, e.g. the $R_1$ halosulfites, especially the chlorosulfite. Said derivatives are advantageously used together with the salts of the 18-O-$R_2$-16,17,18-triepi-deserpidic acid.

The above mentioned reactions are carried out according to standard methods, described in more detail in the corresponding literature (for example in U.S. Patent No. 3,126,390), in the presence or absence of diluents, preferably such as are inert to the reagents and are solvents thereof, of catalysts, condensing agents and/or inert atmospheres, at low temperatures, room temperature or elevated temperatures and at atmospheric or superatmospheric pressure.

The reaction (a) preferably is carried out with a halide of the acid $R_2$—OH, especially the chloride thereof, advantageously in the presence of a liquid base, such as pyridine. For the reaction (b) the esterification with the diazo compound or the transesterification method is preferred. The diazo reagents are advantageously used in solution of an inert diluent, such as an ether, e.g. diethyl ether, and are combined with a solution or even suspension of the deserpidic acid in an inert diluent. The addition of methanol according to (c) is advantageously carried out in the presence of a basic condensing agent, for example an alcoholate, such as an alkali metal alkanoate, e.g. sodium methylate. The preferred hydrogenating agent according to reaction (d) is nascent hydrogen as is generated, for example, by the action of acids, e.g. acetic and/or perchloric acid, on a base metal, such as zinc. The isomerization according to (e) is carried out, for example, in the presence of a mineral acid, e.g. hydrochloric or perchloric acid, a carboxylic and/or sulfonic acid, e.g. acetic and p-toluene sulfonic acid, and by exploiting differences in the solubilities of starting and final product in order to displace the reaction equilibrium in favor of the 3β-compounds.

The compounds of the invention are obtained in the free form or in the form of their salts, depending on the conditions under which the process is carried out; the salts are also included in the present invention. Salts that are obtained can be converted into the free bases in known manner, for example, with alkalis or ion exchangers. Free bases that are obtained can be converted into salts by reaction with inorganic or organic acids, especially those that are suitable for the formation of therapeutically useful salts. Such acids are, for example, hydrohalic acids, e.g. hydrochloric or hydrobromic acid, sulfuric, phosphoric, nitric or perchloric acid, aliphatic, alicyclic, araliphatic, aromatic, or heterocyclic carboxylic or sulfonic acids, for example, formic, acetic, propionic, succinic, glycollic, lactic, malic, tartaric, citric, ascorbic, maleic, hydroxymaleic, pyroracemic, phenylacetic, benzoic, aminobenzoic, anthranilic, hydroxybenzoic, salicylic, aminosalicylic, embonic, nicotinic, methanesulfonic, ethanesulfonic, hydroxyethanesulfonic, ethylenesulfonic, halogenbenzene-sulfonic, toluenesulfonic, naphthalenesulfonic and sulfanilic acid; methionine, tryptophan, lysine and arginine.

These or other salts of the new compounds, for example, the picrates, can also be used for purification of the bases obtained; the bases are converted into salts, the salts are separated and the bases are liberated from the salts. In view of the close relationship between the free compounds and the compounds in the form of their salts, whenever a free base is referred to in this context, a corresponding salt is also intended, provided such is possible or appropriate under the circumstances.

The invention further includes any variant of the present process, in which an intermediate product obtainable at any stage of the process is used as starting material and any remaining steps are carried out, or the process is discontinued at any stage thereof, or in which the starting materials are formed under the reaction conditions, or in which the reaction components may be used in the form of their salts.

Mainly, those starting materials should be used in the reactions of the invention that lead to the formation of those compounds indicated above as being specially valuable.

The present invention also comprises the new starting material disclosed above under items (a) to (e). Several of them, especially the $R_1$ 17-desmethoxy-18-O-$R_2$-18-epi-$\Delta^{16}$-deserpidates, also exhibit valuable pharmacological properties, such as hypotensive activity. The 18-epimers of said $\Delta^{16}$-deserpidates, i.e. the $R_1$ 17-desmethoxy-18-O-$R_2$-$\Delta^{16}$-deserpidates, which also may serve as intermediates, show sedative and tranquilizing properties.

The $R_1$ 16,17,18-triepi-deserpidates can be obtained from the corresponding $R_1$ 18-epi-deserpidates, which are disclosed in USP 3,126,390, by the action of alcoholates, e.g. sodium methylate, in alcoholic solution under anhydrous conditions. In this reaction the $R_1$ 17-desmethoxy-18-epi-$\Delta^{16}$-deserpidates are formed as intermediates, which can be separated, if desired. Instead of choosing in this reaction the $R_1$ 18-epi-deserpidates, the $R_1$ deserpidates may be used in order to obtain the $R_1$ 16,17-diepi-deserpidates or $R_1$ 17-desmethoxy-$\Delta^{16}$-deserpidates respectively. These compounds can be epimerized in 18-position by hydrolysis of the corresponding 18-O-sulfonyl compounds, e.g. the 18-O-tosyl or -brosyl compounds. The $R_1$ 16,17,18-triepi-deserpidates so obtained can be hydrolyzed, for example by the action of a moist alcoholic solution of an alkali metal hydroxide or carbonate, e.g. sodium hydroxide or potassium carbonate. The free acid so obtained may be esterified first in 18-position, for example analogous to the method (a). The $R_1$ 18-O-$R_2$-16,17,18-triepi-$\Delta^3$-deserpidates may be obtained by condensation of an $R_1$ 18-O-$R_2$-16,17,18-triepi-3-oxo-2,3-seco - deserpidate in the presence of phosphorus oxychloride or by refluxing the quaternary ammonium compounds with ethanol amine; said quaternaries are usually obtained as by products in the esterification of an 18-O-$R_2$-16,17,18-triepi-deserpidic acid, or the corresponding 18-hydroxy derivative thereof, with an aliphatic diazo compound, then acylating any 18-hydroxy compound obtained according to reaction (a). Finally the $R_1$ 18-O-$R_2$-3,16,17,18-tetraepi-deserpidates may be obtained analogous to the method described for the $R_1$ 16,17,18-triepi-deserpidates by selecting as starting material an $R_1$ 3,18-diepi-deserpidate instead of an $R_1$ 18-epi-deserpidate, and acylating the $R_1$ 3,16,17,18-tetraepi-deserpidate obtained according to method (a).

Starting materials or final products that are mixtures of isomers may be separated into simple isomers by methods in themselves known. For example, compounds that contain one or more asymmetrical carbon atoms may be in the form of racemate mixtures, pure racemates, or optical antipodes.

Mixtures of racemates, by virtue of the physicochemical differences between the components, can be resolved into the stereoisomeric pure racemates (diastereoisomers), for example, by chromatography and/or fractional crystallization. Racemic products can likewise be resolved into the optical antipodes, for example, by reaction with optically active acids, separation of the diastereomeric salts and liberation of the bases from the salts.

The compounds of the invention can be used in the free form or in the form of their salts, for example, for the manufacture of pharmaceutical preparations containing the said compounds in admixture with organic or inorganic, solid or liquid pharmaceutical excipients suitable especially for enteral but also for parenteral administration. Suitable excipients are substances that do not react with the new compounds, for example, water, gelatine, lactose, starch, stearyl alcohol, magnesium stearate, talc, vegetable oils, benzyl alcohols, gums, propylene glycols, white petroleum jelly and other known medicinal excipients. The pharmaceutical preparations may be, for example, tablets, dragees or capsules, or in liquid form as solutions, suspensions or emulsions. They may be sterilized and/or contain adjuvants, such as preserving, stabilizing, wetting or emulsifying agents, solution promoters, salts for regulating the osmotic pressure or buffers. They may further contain other therapeutically valuable substances. The pharmaceutical preparations are prepared by conventional methods.

The following examples illustrate the invention:

*Example 1*

0.436 g. of methyl 16,17,18-triepi-reserpate, 0.600 g. 3,4,5-trimethoxybenzoyl chloride and 3 ml. pyridine (dried over calcium hydride) are mixed to give an amber solution which forms a gel in a few minutes. Thin-layer chromatography of a sample taken after 5 minutes indicates almost complete reaction. Water (10 ml.) and methylene chloride (15 ml.) are added, the aqueous phase is separated, made alkaline with ammonium hydroxide and re-extracted with methylene chloride. The combined methylene chloride extracts are washed with two portions each of 3 ml. sodium chloride solution and 1 portion of 3 ml. water. After drying over sodium sulfate the solvents are removed in vacuo, and repeated vacuum distillation of methanol from the residue results in the complete removal of the pyridine. The residue is dissolved in 7 ml. methylene chloride, washed with 4 ml. dilute ammonium hydroxide and the methylene chloride phase and the methylene chloride re-extractions of the aqueous phase are dried over sodium sulfate and evaporated to a tan froth. This is dissolved in a small volume of warm methanol, the solution cooled and seeded with crystals obtained by a filtration through alumina of a chloroform solution of a few milligrams of the above residue. After cooling at 5° C. overnight the resulting crystals are filtered off, washed sparingly with methanol and dried in a vacuum desiccator. There is obtained the methyl 18-O-(3,4, 5 - trimethoxybenzoyl)-16,17,18-triepi-reserpate monohydrate melting at 231–233°.

The starting material can be obtained as follows: A solution prepared by the reaction of 0.25 g. sodium with 50 ml. anhydrous methanol is refluxed for 70 hours with 1.0 g. methyl 18-epi-reserpate. The reaction mixture is cooled and then evaporated in vacuo to a white froth. After the addition of water (5 ml.) the alkaloidal material is extracted with one portion of 25 ml. methylene chloride and two portions each of 10 ml. methylene chloride. The combined methylene chloride extracts are washed with 2–5 ml. water, dried over sodium sulfate and evaporated. The residue is recrystallized from isopropanol and gives the methyl 16,17,18-triepi-reserpate melting at 243–244°; optical rotation $[\alpha]_D^{25} = +60°$ (in chloroform).

The mother liquors are freed of solvent and give an additional amount of said compound which upon recrystallization from ethyl acetate melts at 245–246°.

*Example 2*

1.632 g. of a mixture containing predominantly methyl 16,17,18-triepi-reserpate and methyl 17-desmethoxy-18-epi-$\Delta^{16}$-reserpate are dissolved in 8 ml. pyridine (dried over calcium hydride), acetic anhydride (15 ml.) is added and the reaction mixture allowed to stand at room temperature for 68 hours. Thereupon ice is added, the solution is made basic by the addition of 35 ml. concentrated ammonium hydroxide and then extracted with four portions each of methylene chloride. The combined methylene chloride extracts are washed with four portions each of 35 ml. of a half saturated solution of sodium chloride. After drying the extract over sodium sulfate it is filtered and evaporated in vacuo. From the residue methanol is distilled off repeatedly in order to remove the pyridine completely.

The fractionation of 1.60 g. of the residue obtained is accomplished by chromatography on a column of 100 g. activated alumina (WOELM activity 1), 9 inches in height and 1 inch in diameter, prepared in a tightly packed manner by the addition (with tapping) of the absorbent to the methylene chloride contained in the column. The sample (1.6 g.) is introduced onto the column in 12 ml. methylene chloride. Employing a flow rate of 6 ml. per minute, the column is developed by eluting with one portion of 250 ml. methylene chloride (Fraction 1), 6 portions each of 250 ml. methylene chloride containing 0.1% methanol (Fractions 2–7), 1 portion of 700 ml. methylene chloride containing 0.1% methanol (Fraction 8), 4 portions each of 250 ml. methylene chloride containing 0.1% methanol (Fractions 9–12) and finally with 4 portions each of 250 ml. methylene chloride containing 1.0% methanol (Fractions 13–16). Thin-layer chromatography (alumina) using a system made up of cyclohexan, chloroform and diethylamine (5:45:1) shows a major spot at $R_{cm} = 6.0$ in Fractions 7, 8 and 9, and a major spot in Fraction 14 at $R_{cm} = 7.0$, while the original solution used for chromatography also shows major spots of about equal size at $R_{cm} = 6.0$ and 7.0.

Fractions 7, 8 and 9 are combined, evaporated and the solid residue is crystallized from 3.5 ml. methanol yielding nearly colorless flat plates of methyl 18-O-acetyl-16, 17,18-triepi-reserpate, M.P. 251–252°. Fractions 10, 11 and 12 are combined, evaporated and the residue is crystallized from 1 ml. methanol to give an additional crop of the same compound.

Fractions 14, 15 and 16 are combined, evaporated and the residue crystallized from aqueous methanol giving the methyl 17-desmethoxy-18-O-acetyl-18-epi-$\Delta^{16}$-reserpate, M.P. 200–205°.

The starting material can be obtained as follows:

A partial solution of 1.0 g. methyl 18-epi-reserpate in 3 ml. pyridine (dried over calcium hydride) and 7 ml. acetic anhydride is allowed to stand in the dark at room temperature for 65 hours. The clear, dark amber solution is poured with stirring into 50 ml. ice and water, made basic with concentrated ammonium hydroxide and extracted repeatedly with portions each of 25 ml. methylene chloride until the aqueous raffinate no longer gives a positive reaction with Mayers Reagent. The combined methylene chloride extracts are washed with 15 ml. water, dried over sodium sulfate, filtered and evaporated to a semi-crystalline frothy-solid. Several small volumes of methanol are added to the residue and repeatedly distilled off in order to remove traces of pyridine. The product is crystallized from 30 ml. methanol to give, after filtering and washing the methyl 18-O-acetyl-18-epi-reserpate, M.P. 255–257°.

A solution prepared from 2.5 g. sodium and 250 ml. anhydrous methanol is refluxed for 6 hours in an anhydrous atmosphere with 5.00 g. of methyl 18-O-acetyl-18-epi-reserpate (system protected by a calcium chloride drying tube). The reaction mixture is evaporated in vacuo at a bath temperature of 45–50° to a semi-dry state and methylene chloride (100 ml.) and water (40 ml.) are added to the residue. The phases are separated and the aqueous phase re-extracted with two portions each of 50 ml. methylene chloride and with one portion of 100 ml. methylene chloride. After combining the methylene chloride extracts they are washed with two portions each of 40 ml. of a concentrated sodium chloride solution, dried over sodium sulfate and evaporated in vacuo to a frothy solid. This is dried in a vacuum desiccator overnight and dissolved in 120 ml. boiling iso-propanol. The solution is concentrated under nitrogen to about 90 ml. when crystals start forming from the hot solution. After cooling the crystals are collected and washed with cold iso-propanol. In a similar manner three additional crystallizations are carried out to give white, triangular plates of methyl 17-desmethoxy-18-epi-$\Delta^{16}$-reserpate.

The mother liquors from the above crystallizations are combined, evaporated and the residue is dissolved in a solution prepared from 1.1 g. sodium and 125 ml. of anhydrous methanol and refluxed for 48 hrs. in a system protected by a calcium chloride drying tube. After evaporating the reaction mixture in vacuo to a semi-dry state, methylene chloride and water are added. The methylene chloride extract is then washed with 4 small portions of a concentrated sodium chloride solution, dried over sodium sulfate and evaporated. The residue, which is dried in a high vacuum for 6 hours, represents a mixture containing predominantly the methyl 16,17,18-triepi-reserpate and methyl 17-desmethoxy-18-epi-$\Delta^{16}$-reserpate.

*Example 3*

A solution of 0.200 g. methyl 17-desmethoxy-$\Delta^{16}$-reserpate, 0.400 g. 3,4,5-trimethoxybenzoyl chloride in 2 ml. pyridine (dried over calcium hydride) is allowed to stand in the dark at room temperature for 18 hours. Thin-layer chromatography of a small aliquot of the reaction mixture on alumina with chloroform indicates complete reaction after this time. Ice and water and then concentrated ammonium hydroxide are added until basic, and the mixture is extracted with 15 ml. methylene chloride. After washing with 3 portions of a concentrated sodium chloride solution the methylene chloride extract is dried over sodium sulfate and evaporated under reduced pressure. Residual pyridine is removed by repeatedly distilling small portions of methanol from the residue, which yields upon crystallization from ethyl acetate a portion of 3,4,5-trimethoxy-benzoic acid. The resulting mother liquor is chromatographed on 15 g. alumina (WOELM, activity III). After introducing the sample in 2 ml. benzene, the column is eluted with three portions of benzene, 22 ml., 27 ml. and 35 ml.; then with three portions of chloroform, 45 ml., 45 ml. and 40 ml. The first of the three chloroform fractions, after evaporation, is re-chromatographed on 8 g. of alumina (WOELM, activity I) eluting with 4 portions of chloroform, 5 ml., 10 ml., 12 ml. and 15 ml. Fractions 2 and 3 are combined and after evaporation this material is further chromatographed on 10 g. alumina (WOELM, activity I) eluting with one portion of 20 ml. benzene, one portion of 25 ml. methylene chloride, and two portions of 20 ml. and 25 ml. of chloroform, respectively. The first of the two chloroform eluates, after evaporation, is treated with ether-hexane, finally allowing to go to dryness giving an amorphous solid, M.P. 130–135°, $[\alpha]_D^{25}$ +46° (CHCl$_3$); it represents the methyl 18-O-(3,4,5-trimethoxy-benzoyl)-17-desmethoxy-$\Delta^{16}$-reserpate. Additional material, similar to the above but somewhat impure, is obtained from the second of the two chloroform eluates.

The starting material can be obtained as follows:

A solution prepared from the reaction of 6.0 g. sodium metal with 800 ml. anhydrous methanol is refluxed for 89 hours with 20.0 g. methyl reserpate acetate in a system protected from atmospheric moisture by a calcium chloride drying tube. The reaction mixture is evaporated in vacuo to semidryness and the residue dissolved in 300 ml. methylene chloride. After washing with one portion of 100 ml. water, three portions each of 100 ml. of concentrated sodium chloride solution, and finally with one portion of 50 ml. water the methylene chloride extract is dried over sodium sulfate, filtered and evaporated to a light green frothy solid.

8.00 g. therefrom are slurried with 50 ml. isopropanol and heated to boiling whereupon crystals begin to form. The mixture is immediately cooled and kept cold for 2 hours. After collecting the crystals they are slurried with 30 ml. isopropanol, the solution brought to boiling and then quickly cooled. The crystals so obtained melt at 148° with foaming and represent the methyl 16,17-diepi-reserpate, containing isopropanol of crystallization.

The fractionation of a 3.0 g. portion of the cream colored froth obtained by evaporation of the above two mother liquors is carried out by chromatography on 300 g. of alumina, (WOELM, activity III) using a column 6¼ inches high and 2 inches in diameter. The column is prepared from a suspension of the alumina in chloroform, tapping the column in order to tightly pack the adsorbent. Introduction of the same onto the column is made with a 5 ml. solution of the 3.0 g. at a flow rate of 0.2 ml./min. which is gradually increased to 1 ml./min. and then to 2–2.5 ml./min. after a time of 3 hours has elapsed from the start of the elution. Four hours after sample introduction a fast moving yellow band is one inch from the bottom of the column, the collection of 41 fractions each of 50 ml. is started, using an automatic fraction collector. Fraction 1 through 10 are obtained by elution with chloroform while Fractions 11 through 41 by elution with chloroform containing 1% methanol. Each fraction is analyzed by thin-layer chromatography on alumina and using the following solvent systems:

chloroform containing 0.4% methanol (Fractions 1–9);
chloroform containing 1.0% methanol (Fractions 10–23);
chloroform containing 2% methanol (Fractions 24–41).

Iodine vapor is used for the detection of the spots. On the basis of the thin-layer chromatograms the following fractions are combined and evaporated to dryness:

Fractions 4–7 contain methyl 17-desmethoxy-18-desoxy-16-epi-18-keto-reserpate,
Fractions 11–17 contain methyl 16,17-diepi-reserpate,
Fractions 19–23 contain a mixture of several compounds,
Fractions 24–27 contain methyl 16-epi-reserpate,
Fractions 29–31 contain mostly methyl 17-desmethoxy-$\Delta^{16}$-reserpate,
Fractions 32–41 contain methyl 17-desmethoxy-$\Delta^{16}$-reserpate.

Methyl 17-desmethoxy-$\Delta^{16}$-reserpate, crystallizes from ether or acetone, it gives white needles melting at 230–232° when measured in an evacuated capillary tube; $[\alpha]_D^{25}$ +25° (in chloroform).

What is claimed is:

1. A member selected from the group consisting of 16,17,18-triepi-deserpidic acid esters of the formula

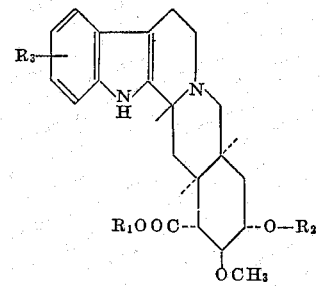

in which $R_1$ stands for a member selected from the group consisting of lower alkyl, lower alkoxy-lower alkyl, di-lower alkylamino-lower alkyl, lower alkyleneimino-lower alkyl, aza-lower alkyleneimino-lower alkyl, oxa-lower alkyleneimino-lower alkyl and thia-lower alkyleneimino-lower alkyl in which the heteroatoms are separated by at least two carbon atoms, $R_2$ for a member selected from the group consisting of lower alkanoyl, lower alkenoyl, lower alkynoyl, cycloalkylcarbonyl, cycloalkenylcarbonyl, cycloalkyl-lower alkanoyl, cycloalkenyl-lower alkanoyl, cycloalkyl-lower alkenoyl, cycloalkenyl-lower alkenoyl, in which the cycloaliphatic nuclei have from 5 to 6 ring carbon atoms monocyclic carbocyclic aryl-lower alkanoyl, aryl-lower alkenoyl and aroyl and $R_3$ for a member selected from the group consisting of hydrogen and lower alkoxy, and an acid addition salt thereof.

2. A member selected from the group consisting of a compound having the formula

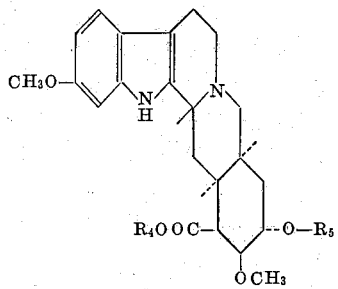

in which $R_4$ stands for lower alkyl and $R_5$ for a member selected from the group consisting of benzoyl and cinnamoyl both of which are substituted in the ring by a member selected from the group consisting of lower alkoxy and lower alkoxy-carbonyloxy, and an acid addition salt thereof.

3. A member selected from the group consisting of methyl 18-O-acetyl-16,17,18-triepi-reserpate and an acid addition salt thereof.

4. A member selected from the group consisting of methyl 18-O-(3,4,5-trimethoxy-benzoyl)-16,17,18 - triepi-reserpate an acid addition salt thereof.

5. A member selected from the group consisting of a compound having the formula

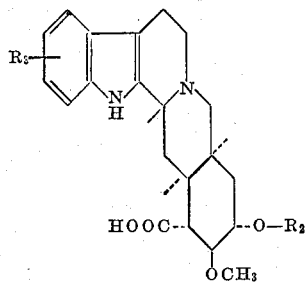

$R_2$ stands for the acyl residue of a carboxylic acid selected from the group consisting of cycloalkane carboxylic, cycloalkene carboxylic, cycloalkane-lower alkanoic, cycloalkane-lower alkenoic, cycloalkenyl-lower alkanoic, cycloalkenyl-lower alkenoic, in which the cycloaliphatic nuclei have 5 to 6 ring carbon atoms, lower alkanoic, lower alkenoic, lower alkynoic, said aliphatic carboxylic acids substituted by a member selected from the group consisting of hydroxy, lower alkoxy, lower alkanoyloxy, lower alkoxy-carbonyloxy, lower alkanoyl, halogen, and primary amino, di-lower alkyl-amino, phenyl-lower alkanoic, phenyl-lower alkenoic, and phenyl-carboxylic, and said phenyl-group-containing carboxylic acids substituted being a member selected from the group consisting of hydroxy, lower alkoxy, lower alkanoyloxy, lower alkoxy-carbonyloxy, lower alkanoyl, halogen, primary amino, di-lower alkyl-amino, lower alkyl and nitro, and $R_3$ for a member selected from the group consisting of hydrogen and lower alkoxy, and an acid addition salt thereof.

6. A member selected from the group consisting of a compound having the formula

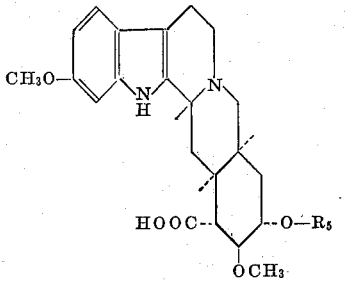

in which $R_5$ stands for a member selected from the group consisting of benzoyl and cinnamoyl both of which are substituted in the ring by a member selected from the group consisting of lower alkoxy and lower alkoxy-carbonyloxy and an acid addition salt thereof.

7. A member selected from the group consisting of a compound of the formula

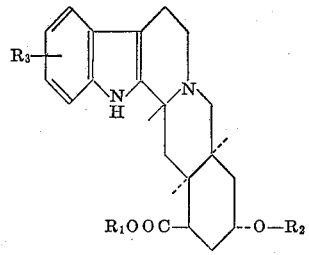

in which $R_1$ stands for a member selected from the group consisting of lower alkyl, lower alkoxy-lower alkyl, di-lower alkylamino-lower alkyl, lower alkyleneimino-lower alkyl, aza-lower alkyleneimino-lower alkyl, oxa-lower alkyleneimino-lower alkyl and thia-lower alkyleneimino-lower alkyl in which the heteroatoms are separated by at least two carbon atoms, $R_2$ for a member selected from the group consisting of hydrogen, lower alkanoyl, lower alkenoyl, lower alkynoyl, cycloalkylcarbonyl, cycloalkenylcarbonyl, cycloalkyl-lower alkanoyl, cycloalkenyl-lower alkanoyl, cycloalkyl-lower alkenoyl, cycloalkenyl-lower alkenoyl, in which the cycloaliphatic nuclei have from 5 to 6 ring carbon atoms monocyclic carbocyclic aryl-lower alkanoyl, aryl-lower alkenoyl and aroyl, and an acid addition salt thereof.

8. A member selected from the group consisting of a compound having the formula

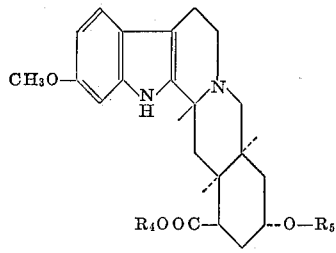

in which $R_4$ stands for lower alkyl and $R_5$ for a member selected from the group consisting of hydrogen, benzoyl and cinnamoyl both of which are substituted in the ring by a member selected from the group consisting of lower alkoxy and lower alkoxy-carbonyloxy, an acid addition salt thereof.

9. A member selected from the group consisting of methyl 18 - O - acetyl-17-desmethoxy-18-epi-$\Delta^{16}$-reserpate and an acid addition salt thereof.

10. A member selected from the group consisting of methyl-17-desmethoxy-18-epi-$\Delta^{16}$-reserpate and an acid addition salt thereof.

11. A member selected from the group consisting of methyl 18 - O-(3,4,5-trimethoxybenzoyl)-17-desmethoxy-$\Delta^{16}$-reserpate and an acid addition salt thereof.

12. A member selected from the group consisting of a compound having the formula

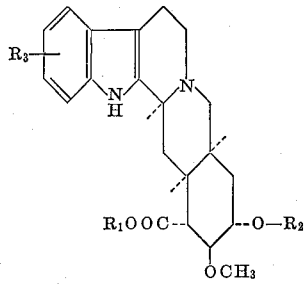

in which $R_1$ stands for a member selected from the group consisting of lower alkyl, lower alkoxy-lower alkyl, di-lower alkylamino-lower alkyl, lower alkyleneimino-lower alkyl, aza-lower alkyleneimino-lower alkyl, oxa-lower alkyleneimino-lower alkyl and thia-lower alkyleneimino-lower alkyl in which the heteroatoms are separated by at least two carbon atoms, $R_2$ for a member selected from the group consisting of lower alkanoyl, lower alkenoyl, lower alkynoyl, cycloalkylcarbonyl, cycloalkenyl-carbonyl, cycloalkyl-lower alkanoyl, cycloalkenyl-lower alkanoyl, cycloalkyl-lower alkenoyl, cycloalkenyl-lower alkenoyl, in which the cycloaliphatic nuclei have from 5 to 6 ring carbon atoms monocyclic carbocyclic aryl-lower alkanoyl, aryl-lower alkenoyl and aroyl and $R_3$ for a member selected from the group consisting of hydrogen and lower alkoxy, and an acid addition salt thereof.

13. A member selected from the group consisting of a compound having the formula

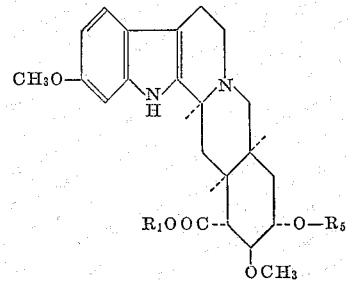

in which $R_4$ stands for lower alkyl and $R_5$ for a member selected from the group consisting of benzoyl and cinnamoyl both of which are substituted in the ring by a member selected from the group consisting of lower alkoxy and lower alkoxy-carbonyloxy, an acid addition salt thereof.

References Cited by the Examiner

UNITED STATES PATENTS 3,126,390   3/1964   Robison _____ 260—287

OTHER REFERENCES

Rosen et al.: Jour. Amer. Chem. Soc., vol. 83 (Oct. 20, 1961), pages 4240–3.

Rosen et al.: Jour. Amer. Chem. Soc., vol. 83 (Dec. 5, 1961), pages 4816–9.

WALTER A. MODANCE, *Primary Examiner.*

JAMES A. PATTEN, *Assistant Examiner.*